US005744798A

United States Patent [19]

Kato

[11] Patent Number: 5,744,798

[45] Date of Patent: Apr. 28, 1998

[54] MASS SPECTROMETRY AND MASS SPECTROMETER

[75] Inventor: Yoshiaki Kato, Mito, Japan

[73] Assignee: Hitachi, Ltd., Tokyo, Japan

[21] Appl. No.: 841,002

[22] Filed: Apr. 18, 1997

Related U.S. Application Data

[63] Continuation of Ser. No. 440,120, May 12, 1995, abandoned, which is a continuation of Ser. No. 167,363, Dec. 16, 1993, abandoned, which is a continuation of Ser. No. 942,992, Sep. 10, 1992, Pat. No. 5,298,743.

[30] Foreign Application Priority Data

Sep. 12, 1991 [JP] Japan .................................. 03/232956

[51] Int. Cl.[6] .............................. B01D 59/44; H01J 49/00

[52] U.S. Cl. .............................................. 250/288; 250/282

[58] Field of Search .................................... 250/282, 288, 250/289, 288 A

[56] References Cited

U.S. PATENT DOCUMENTS

| | | | |
|---|---|---|---|
| 3,842,266 | 10/1974 | Thomas | 250/288 |
| 4,209,696 | 6/1980 | Fite | 250/281 |
| 4,740,696 | 4/1988 | Osawa et al. | 250/288 |
| 4,769,540 | 9/1988 | Mitsui et al. | 250/288 |
| 4,842,701 | 6/1989 | Smith et al. | 250/288 |
| 4,963,735 | 10/1990 | Okamoto et al. | 250/288 |
| 4,996,424 | 2/1991 | Mimura et al. | 250/288 |
| 5,015,845 | 5/1991 | Allen et al. | 250/288 A |
| 5,157,260 | 10/1992 | Mylchreest | 250/288 |

FOREIGN PATENT DOCUMENTS

| | | |
|---|---|---|
| 62-15747 | 1/1987 | Japan . |
| 1-311554 | 12/1989 | Japan . |

OTHER PUBLICATIONS

Analytical Chemistry, vol. 62, No. 13, 1st Jul. 1990, pgs. 713A–725A, American Chemical Society; E.C. Huang et al: "Atmospheric pressure ionization mass spectrometry", p. 713A; figures 1–2.

*Primary Examiner*—Bruce Anderson

[57] ABSTRACT

Ions generated under an atmospheric pressure pass through vacuum chambers partitioned through first, second and third fine holes. The ions are led to an MS part where the ions are mass-analyzed. A first vacuum chamber adjacent to an atmospheric pressure part has not vacuum pump for independently pumping this chamber. The first vacuum chamber is evacuated by a common pump together with a second vacuum chamber via a bypass hole formed in the wall having the second aperture. A pressure of the first vacuum chamber can be set to several 100 Pa, while a pressure of the second vacuum chamber can be set to several 10 Pa. Sufficient desolvation has been attained by an ion acceleration voltage of approximately 100 V in the first vacuum chamber, while a speed spread can be restrained. The ions are accelerated by approximately 10 V in the second vacuum chamber, an the speed spread can be restrained as low as possible.

14 Claims, 8 Drawing Sheets

MASS SPECTROMETRY AND MASS SPECTROMETER

This application is a Continuation of application Ser. No. 08/440,120, filed May 12, 1995, abandoned, which is a Continuation of application Ser. No. 08/167,363, filed Dec. 16, 1993, now abandoned, which is a continuation of application Ser. No. 07/942,992, filed Sep. 10, 1992, now U.S. Pat. No. 5,298,743.

FIELD OF THE INVENTION

The present invention relates generally to a mass spectrometry (method of mass analysis) and mass spectrometer (apparatus for mass analysis) and, more particularly, to a mass spectrometry and mass spectrometer for generating ions under an atmospheric pressure and analyzing masses.

DESCRIPTION OF THE RELATED ARTS

Atmospheric pressure ionization (API) is often utilized for mass-analyzing a fluid containing sample and solvent components flowing from a liquid chromatograph (LC). In this atmospheric pressure ionization, soft ionization is effected so as not to impart an excessive energy to sample molecules. For this reason, the sample is decomposed to a less extent upon ionization, and the molecular ions are easy to observe. Further, because of the ionization under a high pressure (atmospheric pressure), even a substance having a low ionization potential is ionized at a high ionization efficiency. Therefore, a highly sensitive mass analysis can be expected. The ionization under an atmospheric pressure is described in detail in Analytical Chemistry, Vol. 62, No. 13, pp. 713A–725A (1990).

The ions have to be introduced into a vacuum in order to mass-analyze the ions generated under the atmospheric pressure. If the ions generated under the atmospheric pressure are immediately led into a high vacuum chamber to perform the mass analysis, there arises problems such as contamination in the high vacuum chamber. Hence, in most of the cases, low and intermediate vacuum chambers are provided between the atmospheric pressure and the high vacuum to give a gradual pressure gradient between the atmospheric pressure and the high vacuum, while these chambers are evacuated independently by use of vacuum exhaust pumps.

However, in the case of differentially evacuating the low and intermediate vacuum chambers in that way by use of the independent separate vacuum systems, the vacuum systems become complicated and expensive.

SUMMARY OF THE INVENTION

It is an object of the present invention to provide a mass spectrometry and mass spectrometer capable of simplifying the vacuum systems.

According to the present invention, low and intermediate vacuum chambers are provided between an atmospheric pressure ionizing unit and a high vacuum unit for effecting a mass analysis and are evacuated by a common vacuum system.

According to the present invention, the low and intermediate vacuum-chambers are evacuated in this way by the common vacuum system, and hence the vacuum system is simplified. This in turn leads to a reduction in costs.

The foregoing and other objects, features as well as advantages of the invention will be made clearer from the description of preferred embodiments hereafter referring to the attached drawings.

DETAILED DESCRIPTION OF THE PREFERRED EMBODIMENTS

In advance of describing embodiments of the present invention, the background and fundamentals of the present invention will be at first explained.

Figure 2:
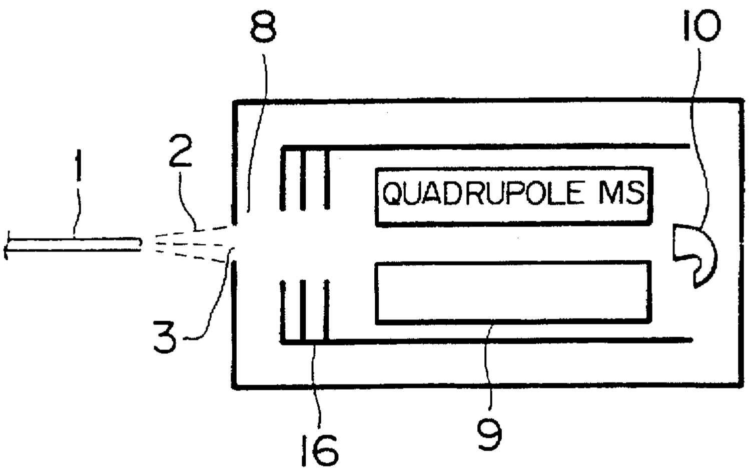
FIG. 2 is a conceptual diagram illustrating an LC/MS device based on the conventional technique.
Figure 3:
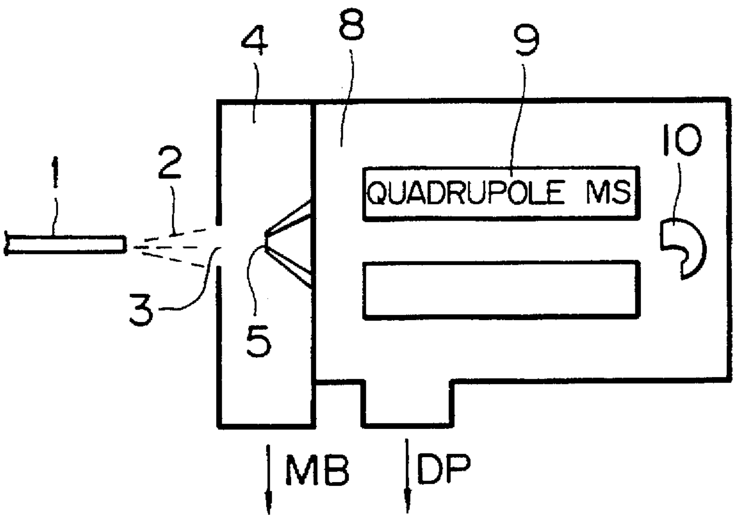
FIG. 3 is a conceptual diagram illustrating the LC/MS device based on the conventional technique.
Figure 4:
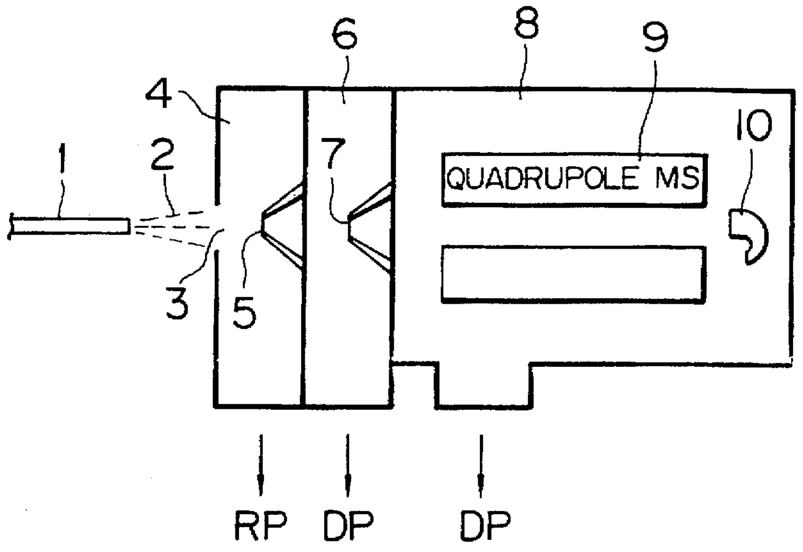
FIG. 4 is a conceptual diagram illustrating the LC/MS device based on the conventional technique.

For mass-analyzing ions generated under an atmospheric pressure, at first, the ions have to be introduced into a vacuum. Further, for a high sensitivity measurement, it is required that the ions be led to a high vacuum mass spectrometer (MS) so as to minimize a loss of the ions generated under the atmospheric pressure (at a high efficiency). For this purpose, vacuum system is the first item which has to be considered in an LC/MS interface, i.e., a mass spectrometer directly connected to the liquid chromatograph (LC). Thus vacuum system is classified roughly into two systems. The first system is, as illustrated in FIG. 2, a method of partitioning an atmospheric pressure part 2 and a vacuum part 8 by use of a partition wall formed with an aperture 3 and sampling the ions generated via this aperture 3. The second system is, as depicted in FIG. 3 or 4, a method of introducing the ions to an MS part 8 through several-staged differential pumping systems employing a plurality of partition walls formed with the aperture 3 and skimmer(s) 5, 7. In the first system, an aperture diameter d (m) and a pumping speed S ($m^3/s$) of a vacuum pump are given as follows to obtain a vacuum required for the MS. A vacuum degree for operation of the MS is herein $10^{-3}$–$10^{-4}$ Pa. A conductance $C_1$ of a gas in viscous flow region of the aperture diameter d (m) is obtained by the formula (1).

$$C_1 \approx 158d^2 \quad (1)$$

Assuming that the pumping speed of the vacuum pump for the MS part is $S_1$ ($m^3/s$), the vacuum $P_1$ of the MS part is obtained by the formula (2). Besides, the atmospheric pressure $P_0$ is approximately $10^5$ Pa.

$$P_1 - C_1(P_0 - P_1)/S_1 \tag{2}$$

The formula (2) can, because of $P_0 >> P_1$, be approximate to the formula (2').

$$P_1 = C_1 \cdot P_0/S_1 \tag{2'}$$

$$= C_1 \times 10^5/S_1 \tag{3}$$

Now, assuming that the vacuum pump for the MS part is an oil diffusion pump having a pumping speed of 1,000 liters/s=1 $m^3/s$, the aperture diameter d required for accomplishing a vacuum degree of $10^{-4}$ Pa in the MS part is given as follows. From the formulae (1) and (3), $$\begin{aligned} d &= \sqrt{\{P_1 \cdot S_1/(157 \times 10^5)\}} \\ &= \sqrt{\{10^{-4} \times 1/(157 \times 10^5)\}} \\ &= 2.52 \times 10^{-6} \text{ (m)} \end{aligned} \tag{4}$$

Namely, the aperture has a diameter of approximately 2.5 μm. If a cryopump having a pumping speed of 10,000 liters/s is employed as the vacuum pump, the aperture diameter is nothing more than 7.9 μm. When the ions are sampled from the atmosphere through the aperture having such a small diameter clogging of the aperture is frequently caused due to matters such as dusts in the air. Further, since the diameter of the aperture is small, a good deal of ions can not be introduced. This makes the high sensitivity measurement difficult. An additional problem is that the cryopump is remarkably expensive. FIG. 2 is a schematic diagram based on this system. The ions sprayed from a spray nozzle 1 and generated under an atmospheric pressure and in a high electrostatic field 2 enter the MS part via the aperture 3. Neutral molecules are trapped by a cooling fin 16 of the cryopump. On the other hand, the ions go straight and undergo a mass sorting in a quadrupole MS 9 and reach a detector 10.

In the case of a system (FIG. 3) based not on such an arrangement that the ions are sampled directly through the single aperture but on such an arrangement that two or more apertures are disposed in series on the same axis; and vacuum regions between partition walls each having therein the aperture is performed by independent vacuum pumps, the vacuum of the MS unit 8 is defined as follows. Let $P_0$ be the atmospheric pressure, and let $P_2$ be the vacuum degree of the MS unit 8. Let $S_1$, $S_2$ be the pumping speeds of the vacuum pumps of the differential pumping system part and MS part, respectively. Let $C_1$, $C_2$ be the conductances of gases of the first and second apertures 3, 5, respectively. Further let $d_1$, $d_2$ be the diameters of the first and second apertures.

The pressure $P_1$ of the differential vacuum chamber 4 is given by the following formula:

$$\begin{aligned} P_1 &= C_1(P_0 - P_1)/S_1 \\ &\approx C_1 P_0/S_1 \end{aligned} \tag{5}$$

Besides, the pressure $P_2$ of the MS part is given by the following formula:

$$\begin{aligned} P_2 &= C_2(P_1 - P_2)/S_2 \\ &\approx C_2 \cdot P_1/S_2 \end{aligned} \tag{6}$$

It is because $P_0 >> P_1 >> P_2$.

From the formulae (5) and (6), $$P_2 = C_1 \cdot C_2 P_0/(S_1 S_2) \tag{7}$$

is derived.

Further, $C_1$ is given by the formula (1).

$$C_1 = 157 d_1^2 \tag{8}$$

The conductance $C_2$ in the molecular flow region is given by the following formula:

$$C_2 = 116 \times A \tag{9}$$

However, A is the area of the aperture. This is further expressed as:

$$C_2 = 116 \times \pi (d_2/2)^2 \tag{10}$$

Hence, the formula (7) is expressed as:

$$P_2 = 157 d_1^2 \times 116 \times \pi (d_2/2)^2 P_0/(S_1 \times S_2) \tag{11}$$

Now, it is assumed that the MS part 8 is evacuated by the oil diffusion pump having a pumping speed of 1,000 liters/s, while the differential vacuum system part 4 is evacuated by a mechanical booster pump of 16.7 liters/s. The diameter of the first aperture 3 is assumed to be 200 μm, while the diameter of the second aperture 5 is assumed be 400 μm. The vacuums $P_1$, $P_2$ of the differential pumping system part 4 and MS part 8 are respectively given from the formulae (5) and (11):

$$\begin{aligned} P_1 &= 37.6 \text{ (Pa)} \\ P_2 &= 5.6 \times 10^{-4} \text{ (Pa)} \end{aligned} \tag{12}$$

The vacuum of the MS part 8 is high enough for the mass analysis. As compared with the first system employing the single aperture and the high speed vacuum pump, the second system using a plurality of apertures and the differential pumping system exhibits such an advantage that the large apertures and the inexpensive vacuum pumps can be utilized. For this reason, the second system is widely utilized in a great number of vacuum devices. Further, as illustrated in FIG. 4, a 3-stage differential pumping system is similarly utilized. This differential pumping system corresponds to a method which is excellent in terms of such a point that the ions generated under the atmospheric pressure are led to the MS part at a high efficiency. In general, the two- or three-stage differential pumping system is used in the LC/MS.

There is also a point to be considered other than the vacuum in the LC/MS interface. When the ions generated under the atmospheric pressure are introduced into the vacuum, a rapid adiabatic expansion takes place. Thus, the introduced ions and molecules are rapidly cooled off. Therefore, the molecules such as those of water and alcohol which have been introduced together with the ions into the vacuum are added to the ions, resulting in a generation of cluster ions. Especially in the case where the sample ion has a good number of charges, or where the ion has a multiplicity of functional groups with a high polarity, there are generated the cluster ions in each of which many molecules such as molecules of water and alcohol are added to the ion. For instance, in the case of an addition of water, this is expressed by the following formula:

$$MH^{30} + n.\ (H_2O) \rightarrow \{MH.n(H_2O)\}^+ \quad (13)$$

The cluster ion is an ion to which a multiplicity of polar molecules are added. However, the type and the number of the molecules to be added are not constant. It is therefore impossible to directly obtain the information on a molecular weight of the sample molecule from the cluster ion by means of the MS. Further, ions having same m/z are distributed widely in the form of a multiplicity of cluster ions, and hence a detected ionic current value is also decreased. Therefore, desolvation for removing the added molecules from the cluster ions is required. Proposed as a method therefor are the following methods and a combinational system thereof. In any case, an external energy greater than the addition energy of the polar molecules is given to the cluster ion, thereby releasing the polar molecules from the ion. If the externally given energy is excessive, the cluster ions are decomposed, and molecular weight information can not be given. Whereas if too low, the release of the added molecules is insufficient, and molecular weight information can not given either. Therefore, the energy imparted to the cluster ion is controlled to exceed slightly the energy that is required for the release of the added molecules. It is required that the energy be repeatedly injected into the ions.

Figure 5:
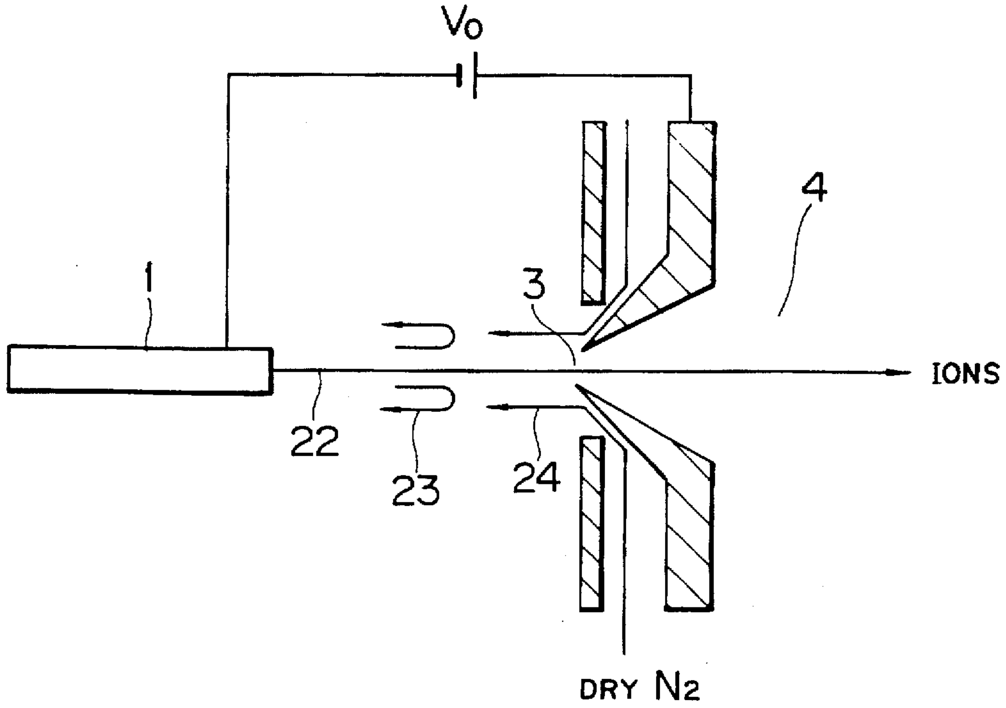
FIG. 5 is a conceptual diagram depicting the LC/MS device based on ionization in a counter gas system.

For release of neutral polar molecules, there may be several possible measures as follows;

(1) Collision with counter gas
(2) Adiabatic compression on Mach disk surface
(3) Heating
(4) Ion acceleration and collision (1) Collision with counter gas:

FIG. 5 is a schematic diagram showing this system. The cluster ions are made to pass through an inert gas which has been heated (~70° C.), e.g., dry nitrogen. Nitrogen molecules are caused to collide with the cluster ions, and the heat is transferred to the cluster ions from the nitrogen molecules continually, thereby releasing the added molecules from the ions. The dry nitrogen is flowed in a direction 24 opposite to a flow of the ions in the vicinity of the ion sampling aperture 3. Therefore, neutral solvent molecules (such as water) flowing together with the ions are flowed back in a direction 23 opposite to the ions sampling aperture 3 due to the dry nitrogen. On the other hand, the ions 22 are accelerated by an electric potential applied between the aperture 3 and the spray nozzle 1 and collide with the dry nitrogen molecules. The ions 22 undergo the desolvation and enter the aperture 3. This also prevents extra polar molecule from entering the vacuum chamber, and a possibility of collision and recoupling within the vacuum chamber can be made low. Although the perfect desolvation is not attainable only by the collision with the counter gas, this system is a preferable method capable of restricting the polar molecules from entering the vacuum chamber. Hence, the desolvation is attainable more efficiently in a combination with the following system than used singly.

(2) Adiabatic compression of Mach disk surface

Figure 6:
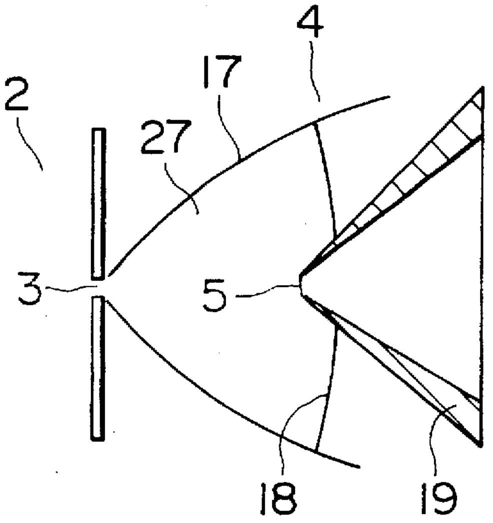
FIG. 6 is a schematic diagram showing a shock wave by a supersonic fluid introduced into a vacuum from an atmospheric pressure.

Gaseous molecules having entered via the aperture from the atmospheric pressure are changed into a supersonic flow of molecules. Consequently, as illustrated in FIG. 6, a Mach disk 18 and a barrel shock 17 depending on the pressure in the vacuum chamber are produced. Where $P_0$ is the pressure of the outside 2 of the aperture 3; $P_1$ is the pressure in the vacuum chamber 4; and d is the aperture diameter, the Mach disk is generated on a distance $X_M$ from the aperture 4.

$$X_M = (2/3)d\sqrt{(p_0/p_1)} \quad (14)$$

For example, assuming that the pressures in front and in rear of the aperture having a diameter of 0.3 mm are $10^5$ Pa (atmospheric pressure) and 100 Pa, the Mach disk is expressed as:

$$\begin{aligned} X_M &= (2/3) \times 0.3 \times \sqrt{(10^5/10^2)} \quad (15) \\ &= 0.2 \times 31.6 = 6.3 \text{ (mm)} \end{aligned}$$

Namely, the Mach disk is generated in a place positioned 6.3 mm away from the aperture towards the high vacuum part. The adiabatic compression is effected on the Mach disk surface, whereby the cluster ions are rapidly heated. As a result, the desolvation is performed. Where the second aperture 5 is disposed in a place positioned 7 mm or more apart backwards from the first aperture 3, the cluster ions invariably pass through the Mach disk surface, thereby promoting the desolvation with heating by the adiabatic compression. This system is a preferable method capable of attaining the desolvation without supply of special external energy. In rear of the Mach disk, however, the flow of molecules becomes absolutely irregular, and the flow of ions entering the second aperture does not become constant. This causes such a defect that a sampling yield of the ions does not increase. Generally, for improving the ions sampling yield, sampling is often effected in a molecular flow region (Silent Zone) 27 in front of the Mach disk where the ions and gas molecules continue their motion in straight line. However, if sampling is effected in the molecular flow region 27, as a matter of course, the desolvation and the adiabatic compression by the Mach disk are not carried out. This implies that a well-directed flow of abundant molecules are merely sampled.

(3) Heating

The gas diffused into the vacuum from the atmospheric pressure is rapidly cooled by the adiabatic expansion. In a case where the gas to be introduced is heated beforehand, and where the interface including the aperture is heated, the adiabatic cooling can be compensated to some extent, and an addition of water and the like can be prevented. It is, however, difficult to attain the perfect desolvation only by heating. It is because most of ions of organic compounds passing through this interface tend to easily undergo the thermal decomposition by heating. It is therefore impossible to perform heating at a high temperature for the purpose of the desolvation.

(4) Ion acceleration and collision

Figure 8:
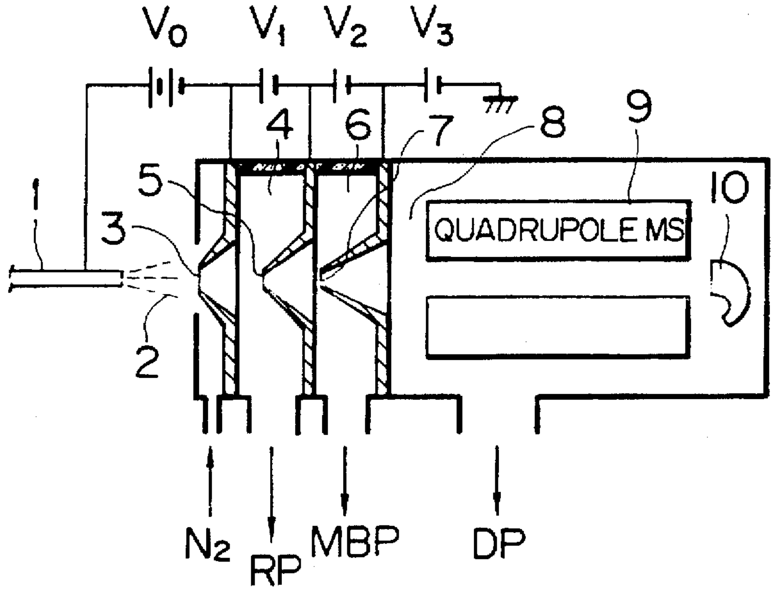
FIG. 8 is a conceptual diagram of the LC/MS of a 3-stage differential pumping system.

If the pressure reaches 100 Pa–10 Pa, a mean free path of the gaseous molecules become about 0.06 to 0.6 mm. When an electric field is applied under such a pressure, the ions existing in the gas are accelerated in a direction along the electric field and collide with the neutral molecules. During a flight of the ions in the electric field, the acceleration and collision are repeated. When the mean free path is 0.1 mm (~66 Pa), the ions are accelerated by approximately 1 eV in the electric field of 100 V/cm, where e is the number of electric valences of the ions. A part of this kinetic energy is transformed into an internal energy (thermal energy) by the collision. If a value of this internal energy exceeds the addition energy (several kJ/mol–several 10 kJ/mol=0.01 eV–0.1 eV) of the molecules of water and the like, the water molecules etc. can be released. Important factors in this desolvation system are a vacuum degree and an intensity of the electric field in the case of the acceleration and collision. Generally, as illustrated in FIG. 8, the electric potential is applied between the first and second apertures 3, 5 or/and between the second and third apertures 5, 7, whereby the ions are accelerated and collide with the neutral molecules. A degree of the desolvation can be changed by controlling the applied voltages $V_1$, $V_2$. This method is remarkably effective in the desolvation. This method, however, has a defect of directly undergoing influences of the pressures of the ion acceleration and collision parts 4, 6. Besides, because of accelerating the ions, there is a risk in which a part of the kinetic energy is not consumed by the collision but is imparted directly to the ions. Therefore, the ions which have entered the high vacuum MS part 8 spread in speed. It follows that this directly brings about declines in resolving power and sensitivity in the mass analysis. If the speed spread exceeds 1 eV, it is difficult to attain the resolving power more than one mass unit in the case of the quadrupole MS. In addition, a transmissivity of the ions is also decreased. In the case of a double focusing mass spectrometer, the large energy dispersion occurs due to the electric field, with the result that the declines in the sensitivity and resolving power are induced.

The mean free path of the nitrogen molecules under from the atmospheric pressure (~$10^5$ Pa) to $10^3$ Pa is approximately $5\times10^{-5}$ mm–$5\times10^{-3}$ mm. Even when the electric field of 100 V/mm is applied under these pressures, the kinetic energy received by the ions ranges from $5\times10^{-3}$ eV to $5\times10^{-1}$ eV, which is considerably lower than 1 eV. The collisions frequently happen in this pressure region, and it is therefore impossible to accelerate the ions, although the ion moving direction can be changed even when the electric field is applied. More specifically, even when the ions are accelerated under this pressure, the spread of the kinetic energy can be restrained not more than 1 eV. On the other hand, under $10^3$ Pa through 1 Pa, the mean free path of the nitrogen molecules ranges from approximately $5\times10^{-3}$ mm to 5 mm. When the electric field of 100 V/mm is applied under this pressure, the kinetic energy received by the ions within the mean free path is as large as $5\times10^{-1}$ eV to $5\times10^{2}$ eV. This causes a large spread of the kinetic energy (speed). On the other hand, in the vacuum of 0.1 Pa to $10^{-4}$ Pa, the mean free path becomes 50 mm to 50 m. Reduced is a probability that the accelerated ions collide with the neutral molecules in the acceleration field. The spread of the kinetic energy is reduced. On the occasion of effecting the ion acceleration and a dissociation of collision, it is necessary to consider this spread of the kinetic energy together. As described above, if the ions are accelerated in the low vacuum ($10^3$ Pa or more) or in the high vacuum ($10^{-1}$ Pa or less), the spread of the speeds of the ions is negligible. There have been already described the advantages in terms of the vacuum system based on the system which utilizes the differential pumping system to take the ions, generated under the atmospheric pressure, into the high vacuum MS. The ions are converged by applying the electric potential between the apertures of this differential pumping system and can be highly efficiently introduced into the MS. Further, at the same time the desolvation by the acceleration, collision and dissociation can be effected. However, the creation of spread of the ion speeds in the process of this desolvation gives an adverse effect.

Figure 7:
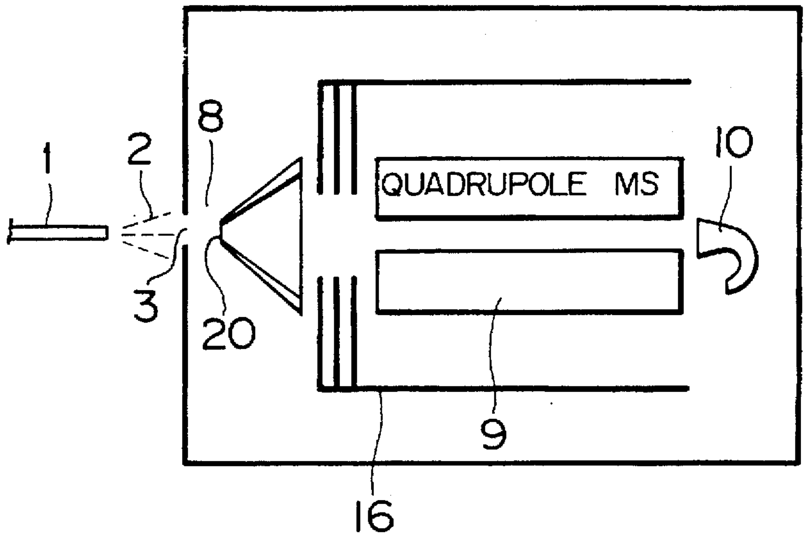
FIG. 7 is a conceptual diagram illustrating the LC/MS device including an ion acceleration electrode for restraining a spread of speed.

In the case of the system, shown in FIG. 7, for taking the ions directly from the atmospheric pressure into the MS part, the vacuum gradually becomes higher from the ions sampling aperture 3 in the ion flying direction of the MS part 8. If there is a sufficient space between the ions sampling aperture 3 and an ion acceleration electrode 20, the ions are accelerated between these two portions and invariably pass through the intermediate pressure region ($10^3$ Pa–1 Pa). Spread of energies of the ions do not occur in the high pressure part ($10^5$–$10^3$ Pa). On the other hand, the ions are accelerated in the region where the pressure ranges from $10^2$ Pa to 1 Pa, and the energy spread is provided. In order to restrain the energy (speed) spread as low as possible, the ion acceleration electrode 20 is positioned close to the ion sampling aperture 3, and the ions are accelerated in the high pressure part ($10^5$–$10^3$ Pa). In this region, however, the cluster ions can not be sufficiently accelerated. The energy required for the desolvation cannot be given to the cluster ions. Therefore, the desolvation in this region can not be expected.

In the case of the differential pumping system of FIG. 3 also, the ion acceleration in the differential pumping system part is an acceleration in the intermediate pressure region ($10^3$–1 Pa), and it follows that the energy spread is imparted. The following prevention measures are required for avoiding this energy spread. The pressure difference is controlled stepwise and accurately by using a plurality of differential pumping system. Further, the desolvation by acceleration is performed in the vacuum of $10^2$ Pa or under, and the ion acceleration is restrained at the possible lowest level under the intermediate pressure of $10^2$–1 Pa. The ions are accelerated at a stretch in the next high vacuum region. This requires a difficult of the pressure control and an intricate and expensive differential pumping system as shown in FIG. 8.

Referring to FIG. 8, the pressure of the first vacuum chamber 4 is kept at $10^3$–$10^2$ Pa, while the ion acceleration voltage $V_1$ is kept at 100–200 V. The second vacuum chamber is maintained at 10–1 Pa, while the ion acceleration voltage $V_2$ is restrained down at 10–20 V. As described above, the collision dissociation is promoted by increasing the ion acceleration voltage in such a low vacuum region as to exert no influence on the ion speed. Whereas in such a region as to exert an influence on the ion speed, the ion acceleration voltage is restrained low. It is not, however, easy to constantly control the pressure and the ion acceleration voltage. Besides, when the high voltage is applied under the intermediate pressure ($10^3$–1 Pa) for promoting the desolvation, a glow discharge readily starts. Once the glow discharge starts, the ions introduced to the interface disappear. Therefore, the pressure under which the discharge can be avoided and the desolvation can be attained is limited. Typically, $5\times10^3$ Pa–50 Pa is a pressure suitable for the desolvation.

The present invention is embodied by the following technique.

In the high pressure region (atmospheric pressure $10^5$ Pa–$10^3$ Pa), the motions of the ions are remarkably restricted even in the electric field. Hence, the control of the direction of the motions of the ions is accomplished by the electric field, and the spread of the speed of the ions is not caused. In the region of $10^2$ Pa–1 Pa, the ions are accelerated and repeatedly collide with the neutral molecules. As a result, a large spread of speed of the ions is caused. Further, in the high vacuum of 1 Pa or lower, a probability of collision of the accelerated ions with residual molecules becomes low, and resultantly the speed spread is also decreased. Namely, if the ions are accelerated in the intermediate region ($10^2$–1 Pa) between the case of the high pressure and the case of high vacuum, the spread of speed is induced. For this reason, the intermediate vacuum region is physically separated from each of the high-pressure part and high-vacuum part through partition walls with orifices. The voltage required for accelerating the ions is applied in each vacuum chamber. Chambers are provided so that the interface parts are depressurized sequentially from the atmospheric pressure. The chamber adjacent to the atmospheric pressure is evacuated not by an independent pump but through a bypass hole opened to the high vacuum part at the next stage, so that a pressure of this chamber can be easily set by a conductance of this hole. The vacuum pump, the pumping duct and the control power supply of vacuum system can be thereby simplified.

It is easy to keep different chambers under different pressures respectively by a single or common pumping system. The ions are accelerated by the electric field of 200 through 100 V/5 mm in the chamber held at a pressure of $10^3$ to $10^2$ Pa. It is therefore possible to provide the number of collisions and energy required for the desolvation while restraining the energy spread within 1 eV. An electric potential (approximately $10^{-20}$ V/5 mm) enough to converge the ions is given in the chamber of $10^2$ to 1 Pa. The energy spread in this region can be thereby restrained within 12 eV.

Figure 1:
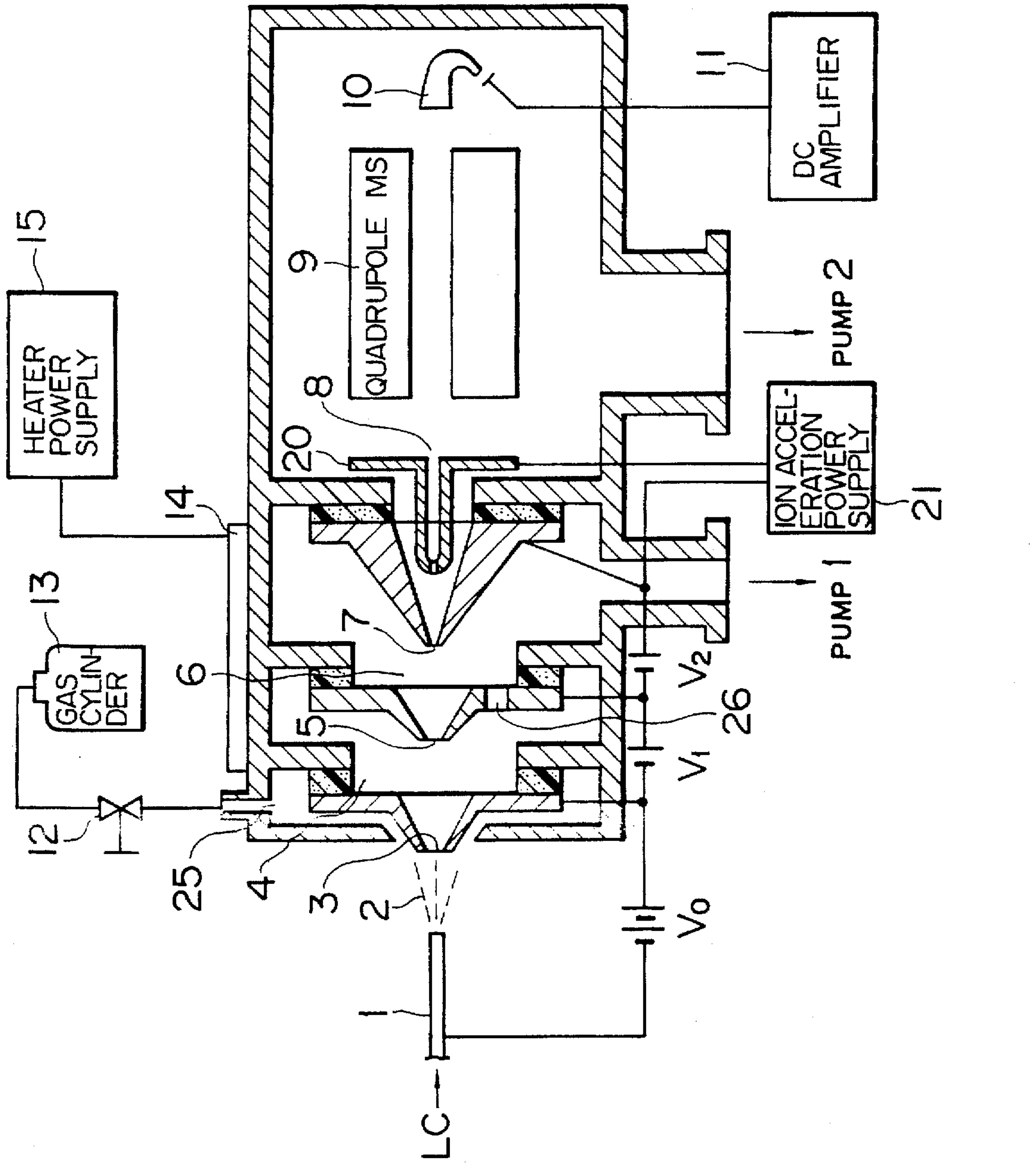
FIG. 1 schematic diagram of a whole arrangement of a liquid chromatograph/mass spectrometer, showing one embodiment according to the present invention.

For describing the embodiment of the present invention with reference to FIG. 1, an ESI (Electro-Spray Ionization, i.e., ionization by spraying a liquid in a high electric field) interface is composed of a spray nozzle 1 to which a high voltage $V_0$ is applied, a counter gas introduction chamber 25, a first aperture (ion sampling aperture) 3, a first vacuum chamber 4, a second aperture 5, a second vacuum chamber 6, a third aperture 7, an ion acceleration power supply 21, a heater 14 and a heater power supply 15.

An eluate fed in from the LC reaches the spray nozzle 1 and is sprayed in the atmosphere 2. A good deal of electric charges are carried on the sprayed droplet surfaces. The droplets are diminished by evaporating the solvent from the droplet surfaces while flying in the atmosphere 2. When a repulsion of the electric charges of the same polarity carried on the surface becomes greater than a surface tension, the droplets are segmented at a stretch. Finally, it comes to a result that the ions have evaporated from the liquid phase to the atmosphere 2 (gas phase). With the intention of helping the segmentation of the droplets and preventing the neutral polar molecules (water, etc.) from entering the interface, the counter gas is made to flow into the atmosphere 2 from the vicinity of the first aperture 3 in a direction opposite to the flying direction of the ions, where the counter gas is fed via a needle valve 12 from a gas cylinder 13. The counter gas is typically heated at 60°–70° C., thus promoting the evaporation of the solvent from the droplets. The ions move with the aid of the electric field while resisting a flow of the counter gas and enters the first vacuum chamber 4 via the first aperture 3. The ions are then accelerated by the voltage $V_1$ applied between the partition walls, of the first vacuum chamber, formed respectively with the first and second apertures 3, 5. The ions then collide with the neutral gaseous molecules and undergo the desolvation. The ions further enter the second vacuum chamber 6 via the second aperture 5. The ions are herein subjected to an acceleration and convergence and enter the third aperture 7. The ions, which have entered the MS part 8 via the third aperture 7, are accelerated by an acceleration voltage applied between the ion acceleration electrode 20 and the third aperture 7 as well. The ions then undergo a mass sorting by the quadrupole MS 9. The ions are detected by the detector 10 and provides a mass spectrum after passing through a DC amplifier 11. The first, second and third apertures typically have a skimmer structure, whereby the diffused neutral molecules are prevented from entering the next vacuum chamber. The first vacuum chamber 4 includes no independent vacuum pump and is structured such that this chamber 4 is evacuated by the vacuum pump 1 through the second vacuum chamber 6 from a bypass hole 26 provided downwardly of the second aperture 5. The MS part is evacuated by an independent vacuum pump 2. Numeral 9 designates a quadrupole, and 21 denotes an ion acceleration power supply.

The interface part is heated by the heater power supply 15 and the heater 14 to prevent cooling due to the adiabatic expansion.

Now, it is assumed that the diameters of the first, second and third apertures are 200 μm, 400 μm and 500 μm, respectively; and the diameter of the bypass hole formed downwardly of the second aperture is 5 mm.

It is also presumed that the pumping speeds of the vacuum pumps 1, 2 are 16.7 liters/s and 1,000 liters/s.

Let $P_1$, $P_2$, $P_3$ be the vacuum degrees of the firs vacuum chamber, the second vacuum chamber and the MS part. Let $C_1$ be the conductance of the first aperture 3, and this conductance is defined by the (1) and therefore given as follows:

$$\begin{aligned} C_1 &= 157d^2 \\ &= 157 \times (0.2 \times 10^{-3})^2 \\ &= 6.3 \times 10^{-6}\ (\mathrm{m^3/s}) \end{aligned} \tag{16}$$

Let $C_2'$ be the conductance of the second aperture 5, and let $C_2''$ be the conductance of the lower bypass hole 26. As $C_2' << C_2''$, the total conductance $C_2$ from the first vacuum chamber 4 to the second vacuum chamber 6 can be approximated:

$$\begin{aligned} C_2 &= C_2' + C_2'' \\ &= C_2'' \end{aligned} \tag{17}$$

The conductance in the molecular flow region is given as follows:

$$\begin{aligned} C_2 &= 116 \times 0.834 \times A \\ &= 116 \times 0.834 \times 3.14 \times (2.5 \times 10^{-3})^2 \\ &= 1.9 \times 10^{-3}\ (\mathrm{m^3/s}) \end{aligned} \tag{18}$$

where the coefficient 0.834 is the conductance correction term of the aperture having a thickness.

Assuming that $Q_1$ is a flow rate of gas flowing into via the first aperture 3 and that $Q_2$ is a flow rate of gas flowing into the second vacuum chamber 6 from the first vacuum chamber 4, the two flow rates are equal.

$$\begin{aligned} Q_1 &= C_1(P_0 - P_1) \approx C_1 P_0 \\ &= 6.3 \times 10^{-6} \times 10^5 \\ &= 0.63\ (\mathrm{Pa \cdot m^3/s}) \end{aligned} \tag{19}$$

$$Q_2 = 1.9 \times 10^3 P_1 \tag{20}$$

As $Q_1 = Q_2$, the pressure $P_1$ of the first vacuum chamber is given by:

$$\begin{aligned} P_1 &= 0.62/(1.9 \times 10^{-3}) \\ &= 0.33 \times 10^3 \\ &= 330\ (\mathrm{Pa}) \end{aligned} \tag{21}$$

The pressure $P_2$ of the second vacuum chamber 6 is given as:

$$P_2 = C_2P_1/S_1 \quad (22)$$
$$= 1.9\times10^{-3}\times330/(16.7\times10^{-3})$$
$$= 37.5 \text{ (Pa)}$$

The vacuum obtained in the second vacuum chamber is better than in the first vacuum chamber by approximately one digit. The vacuum $P_3$ of the MS part is further given as below:

$$P_3 = C_3P_2/S_2 \quad (23)$$
$$= 116\times\pi\times(200\times10^{-6})\times38/(10^3\times10^{-3})$$
$$= 5.5\times10^{-4} \text{ (Pa)}$$

This vacuum is enough for the mass analysis.

Parameters of the associated portions under this condition are summarized as follows:

First aperture diameter: 200 μm

Second aperture diameter: 400 μm

Third aperture diameter: 500 μm

Bypass hole diameter: 5 mm

Pumping speed of pump 1 (e.g., mechanical booster pump): 16.7 liters/s

Pumping speed of pump 2 (e.g., oil diffusion pump): 1,000 liters/s

First vacuum chamber pressure: 330 Pa

Second vacuum chamber pressure: 38 Pa

MS part vacuum chamber pressure: $5.5\times10^{-4}$ Pa

When the bypass hole diameter is changed from 5 mm to 2.5 mm, the pressure $P_1$ of the first vacuum chamber is given as: $330\times(5/2.5)^2=1{,}320$ Pa. Whereas if changed to 8 mm, the pressure is given as $330\times(5/8)^2=129$ Pa.

Further, when the number of the bypass hole having a hole diameter of 5 mm is incremented to two, the pressure is given as: 330/2=165 Pa. In this manner, the pressure of the first vacuum chamber can be set simply by changing the bypass hole diameter or the number thereof. In this example, the system is equivalent to the 2-stage differential pumping system shown in the vacuum system diagram of FIG. 8. Namely, the system is equivalent to a 3-stage differential pumping system including an oil rotary pump (pumping speed: 120 liters/m), a mechanical booster pump (pumping speed: 1,000 liters/m) and an oil diffusion pump (pumping speed: 1,000 liters/s). In the interface depicted in FIG. 1, the oil rotary pump, pumping ducts and a vacuum sequence controller are unnecessary, thereby remarkably simplifying the vacuum system.

Assuming that 100 V is applied between the first and second apertures 3, 5, while 10 V is applied between the second and third apertures 5, 7. Further, assuming that the distances between the first, second and third apertures are respectively 5 mm. The pressure of the first vacuum chamber 4 is 330 Pa, while the pressure of the second vacuum chamber 6 is 38 Pa. Hence, the ions are accelerated on the average in the mean free path by an energy of 0.02×20=0.4 (eV) in the first vacuum chamber 4 and by an energy of 0.17×2=0.34 (eV) in the second vacuum chamber 6. Predicted is a spread of an accelerating energy of 0.4+0.34=0.74 (eV) at the maximum as a total energy of the two chambers. This value is smaller than 1 eV and falls within such a range as to obtain a sufficient sensitivity and resolving power in either the quadrupole MS or the magnetic sector type MS.

Figure 9:
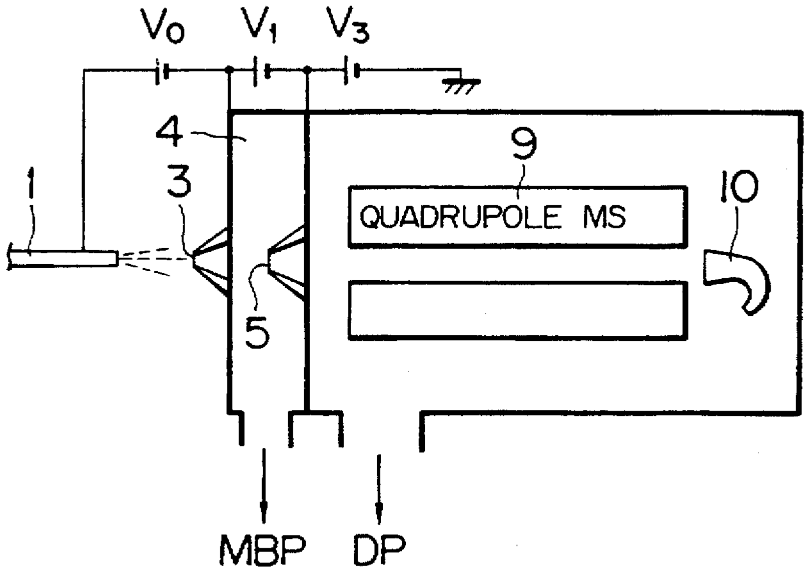
FIG. 9 is a conceptual diagram of the LC/MS of a 2-stage differential pumping system.

In the first vacuum chamber 4, the ions collide with the neutral molecules (such as nitrogen) 250 times, i.e., 5/0.02=250. With a multiplicity of these collisions, the energy of the collision is converted into an internal energy (equivalent to the heated one) such as vibrations enough to dissociate the added molecules. The highly efficient desolvation is thereby attainable. On the other hand, as illustrated in FIG. 9, in the case of 1-stage differential pumping system, the acceleration by the ion acceleration voltage $V_1$ of 100 V is effected. When the pressure of the first vacuum chamber 4 is 38 Pa, it follows that a speed spread will be 0.17×100/5=3.4 (eV) at the maximum. The high resolving power and sensitivity can not be obtained any more.

Figure 10:
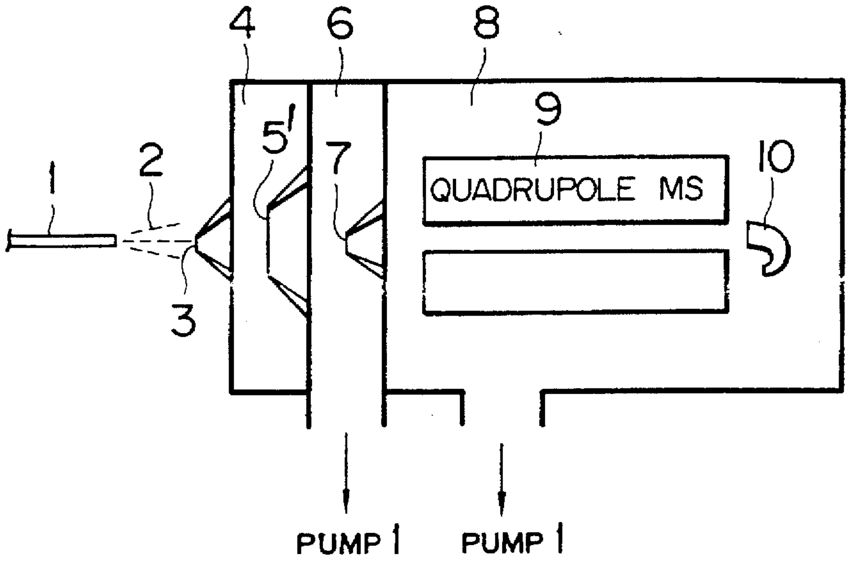
FIG. 10 is a conceptual diagram of the LC/MS device, showing another embodiment of the present invention.

FIG. 10 shows an example where the first vacuum chamber 4 is evacuated only via the second aperture 5. If the diameter of the second aperture is set from several mm to approximately 5 mm, the situation is equivalent to that in the embodiment of FIG. 1.

Figure 11:
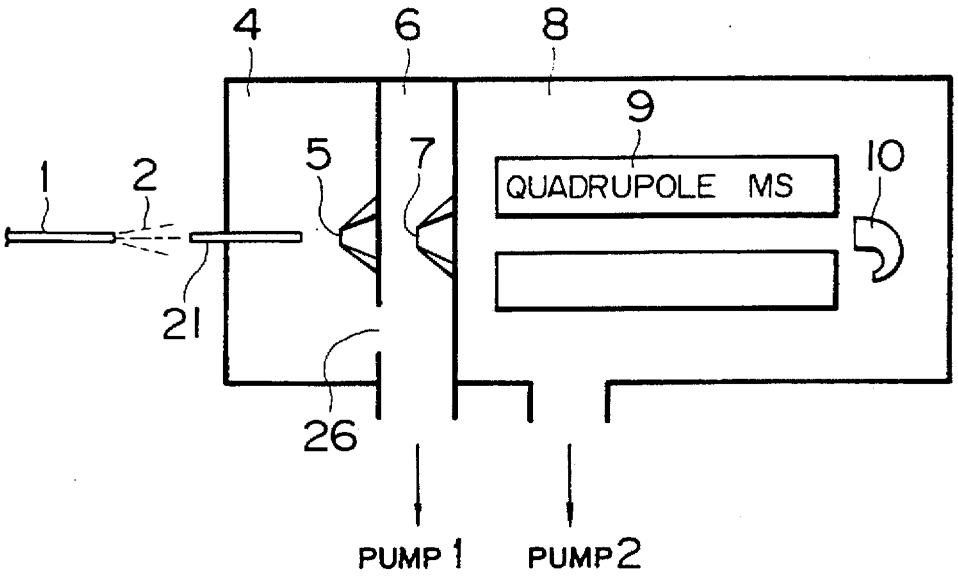
FIG. 11 is a conceptual diagram of the LC/MS device, showing still another embodiment of the present invention.

Another embodiment of the present invention is shown by FIG. 11. Ion sampling is carried out not by the apertures but by a capillary (inside diameter: 0.5–0.2 m, length: 100 mm–200 mm). The capillary may be made of quartz or metallic material such as stainless steel. In the case of quartz, however, it is required that the ion accelerating electric potential be applicable by effecting silver plating or the like on both ends thereof. Besides, it is possible to help the desolvation by heating this capillary. However, the point that the first vacuum chamber is evacuated by the pump 1 via the bypass hole 26 is the same as the embodiment 1.

Figure 12:
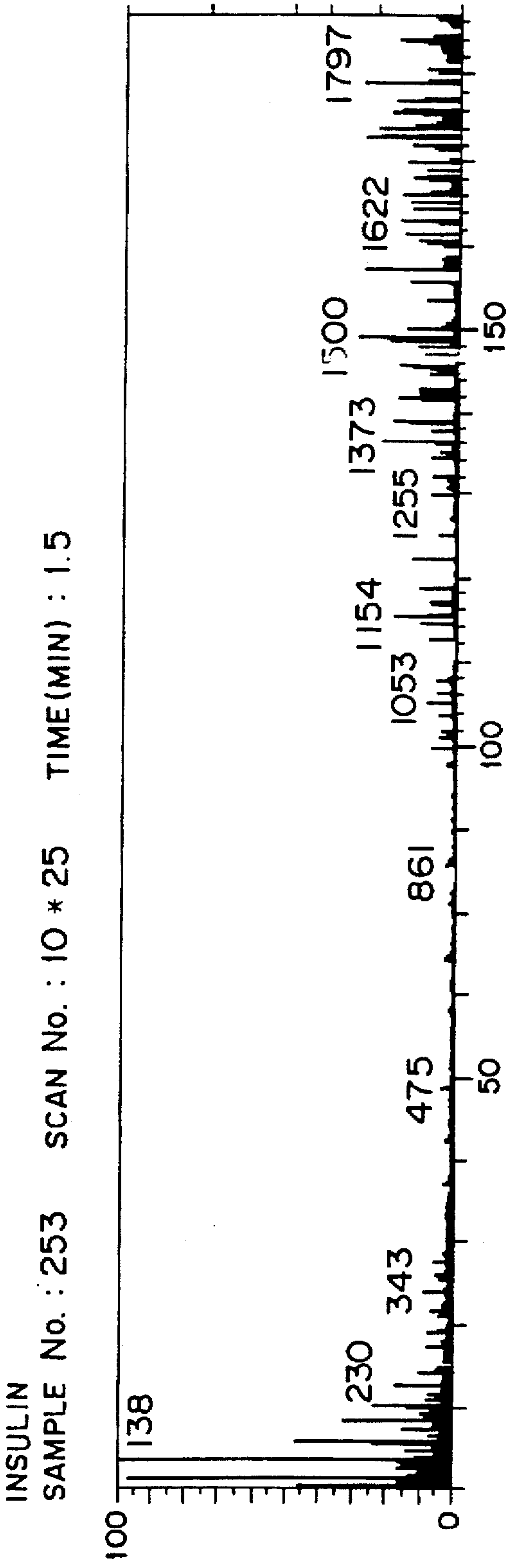
FIG. 12 is a diagram showing an insulin mass spectrum obtained by the conventional system.

FIG. 12 shows an insulin (molecular weight: 5734.6) mass spectrum obtained by the conventional system illustrate in FIG. 9. A quantity of introduced sample was 1 μg. Significant peaks (multiply charged ion) do not appear on the mass spectrum. This measurement involved the use of a double focusing mass spectrometer, wherein the accelerating voltage was 4 kV.

Figure 13:
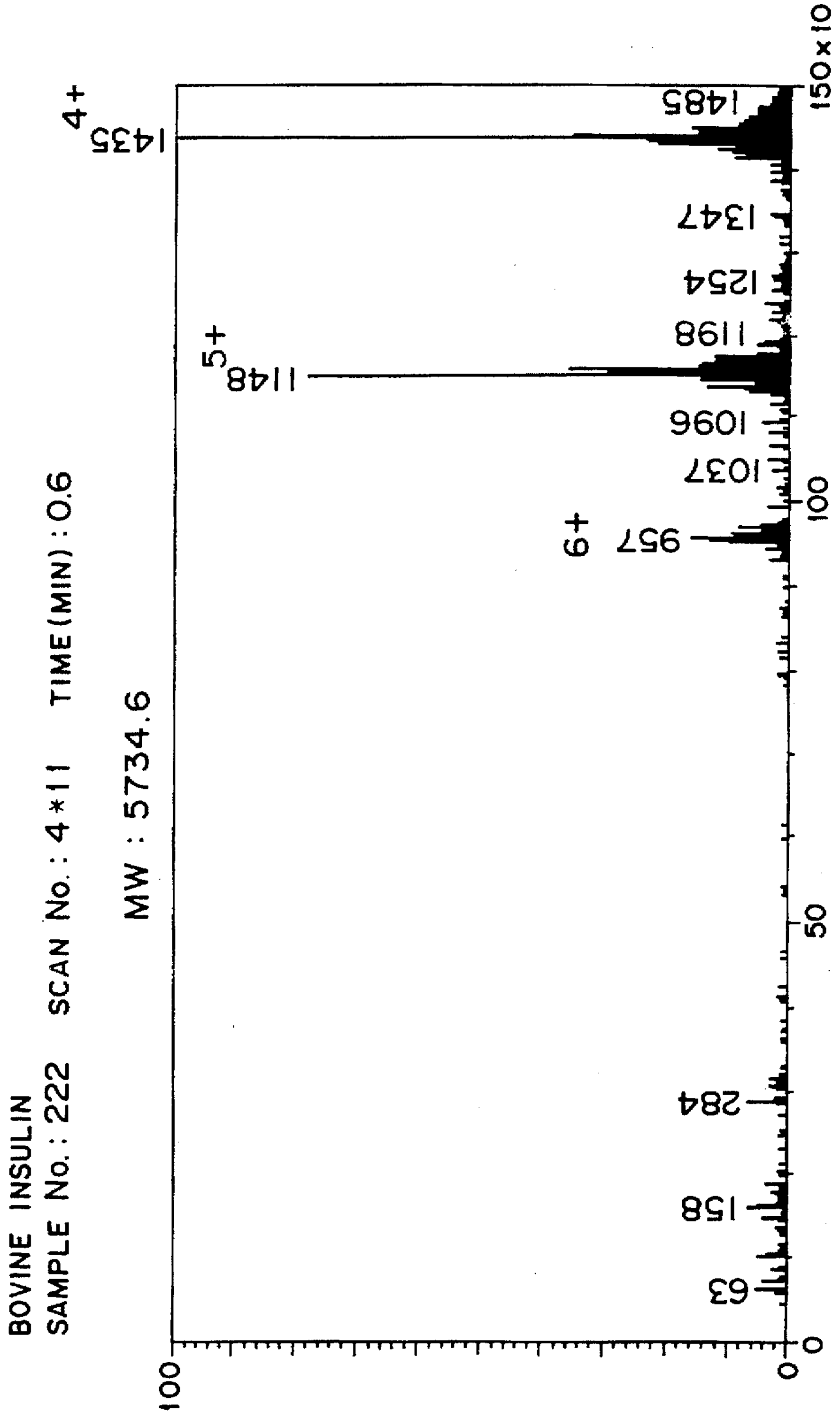
FIG. 13 is a diagram showing the insulin mass spectrum obtained in accordance with the embodiment of the present invention.

FIG. 13 shows a bovine insulin mass spectrum obtained by the embodiment (FIG. 1) according to the present invention. A quantity of introduced sample was 10 ng. In spite of 1/100 of the above-described sample introduction, there obviously appear insulin's multiply charged ions $(M+6H)^6+$, $(M+5H)^5+$, and $(M+4H)^4+$. It can be considered that the desolvation was imperfect in the foregoing system, and the multiply charged ions irregularly appear as noises in a wide mass region or captured by the electric field of the double focusing mass spectrometer. In accordance with the embodiment of the present invention, the desolvation of the multiply charged ions was sufficiently performed, and the mass peak is obviously given onto the mass spectrum. Further, the noises on the mass spectrum due to the cluster ions are reduced.

As discussed above, the multiply charged ions and peusomolecular ions are subjected the sufficient desolvation, and the measurement can be performed with a high sensitivity.

The electro-spray, ionization (ESI) has been exemplified as the atmospheric pressure ionization. The same effects are, however, obtainable by atmospheric pressure chemical ionization (APCI), pneumatically assisted ESI and the like. Further, the present invention is applied not only to the LC/MS but to methods of ionization under the atmospheric pressure as in the case of supercritical fluid chromatography (SFC)/MS and CZE (Capillary Zone Electrophoresis)/MS.

According to the present invention, the differential pumping system is simplified, and the inexpensive device can be provided.

What is claimed is:

1. A mass spectrometer comprising:

means for generating ions in an ion generating region under an atmospheric pressure; a first vacuum chamber disposed adjacent to the ion generating region to pass the ions therethrough; a second vacuum chamber disposed to pass therethrough the ions which have passed through said first vacuum chamber; means for mass-analyzing the ions which have passed through said second vacuum chamber; means for evacuating said first and second vacuum chambers so that a vacuum of said first and second vacuum chambers are different and said first vacuum chamber is maintained under a pressure not higher than $10^2$ Pa; and means for accelerating the ions by a first accelerating voltage in said first vacuum chamber and by an accelerating voltage lower than said first accelerating voltage in said second vacuum chamber.

2. A mass spectrometry comprising the steps of:

generating ions under an atmospheric pressure;

evacuating at least two vacuum chambers by a common vacuum system so that a vacuum of one of the at least two vacuum chambers is at a pressure lower than that of the other of the at least two vacuum chambers; and mass analyzing the generated ions provided via said at least two vacuum chambers.

3. A mass spectrometry comprising the steps of:

ionizing a sample in an atmospheric pressure;

introducing produced ions, through at least a first pressure chamber having a pressure lower than the atmospheric pressure, into at least a second pressure chamber having a pressure lower than the pressure of the first pressure chamber so as to enable mass-analyzation of the ions in the second pressure chamber; and controlling a spread of kinetic energies of the ions in the first pressure chamber to be within 1 eV.

4. A mass spectrometry according to claim 3, wherein the step of controlling of the spread of the energy of the ions within 1 eV includes a step of controlling the pressure and a strength of an electric field in the first pressure chamber.

5. A mass spectrometer comprising:

means for ionizing a sample in an ion generation region under an atmospheric pressure;

means for introducing produced ions, through a first pressure chamber, adjacent to the ion generation region, having a pressure lower than the atmospheric pressure, into a second pressure chamber having a pressure lower than the pressure of the first pressure chamber so as to enable mass-analyzation of the ions in the second pressure chamber; and means for controlling a spread of kinetic energies of the ions in the first pressure chamber to be within one 1 eV.

6. A mass spectrometer according to claim 5, wherein the means for controlling the spread of the energy of the ions within 1 eV includes means for controlling the pressure and a strength of an electric field in the first pressure chamber.

7. A mass spectrometer comprising:

a first chamber under substantially atmospheric pressure for ionizing a sample therein and for generating ions;

a second chamber under a pressure lower than the pressure of the first chamber;

a third chamber under a pressure lower than the pressure of the second chamber; and a fourth chamber under a pressure lower than the pressure of the third chamber for mass-analyzing therein the ionized sample;

wherein the second and third chambers are evacuated by a common evacuation system, and the ions generated in the first chamber are introduced into the fourth chamber at least through the second chamber.

8. A mass spectrometer according to claim 7, further comprising evacuation resistance means at a position between the second and third chambers for providing resistance to evacuation therethrough.

9. A mass spectrometer according to claim 8, wherein the common evacuation system is connected to the third chamber.

10. A mass spectrometer according to claim 7, wherein at least the second chamber enables removal of cluster ions.

11. A mass spectrometry comprising the steps of:

providing a first chamber under substantially atmospheric pressure for ionizing a sample therein and for generating ions;

providing a second chamber under a pressure lower than the pressure of the first chamber;

providing a third chamber under a pressure lower than the pressure of the second chamber;

providing a fourth chamber under a pressure lower than the pressure of the third chamber for mass-analyzing therein the ionized sample;

evacuating the second and third chambers by a common evacuation system; and introducing the ions generated in the first chamber into the fourth chamber at least through the second chamber.

12. A mass spectrometry according to claim 11, further comprising the step of positioning evacuation resistance means between the second and third chambers for providing resistance to evacuation therethrough.

13. A mass spectrometry according to claim 12, further comprising the step of connecting the common evacuation system to the third chamber.

14. A mass spectrometry according to claim 11, further comprising the step of removing cluster ions by the second chamber.

* * * * *